United States Patent
Jeon et al.

(10) Patent No.: US 10,938,223 B2
(45) Date of Patent: Mar. 2, 2021

(54) APPARATUS FOR CHARGING AND DISCHARGING BATTERY

(71) Applicants: Samsung Electronics Co., Ltd., Suwon-si (KR); Research & Business Foundation Sungkyunkwan University, Suwon-si (KR)

(72) Inventors: Jinyong Jeon, Yongin-si (KR); Taejung Yeo, Yongin-si (KR); Seong Chon Choi, Namyangju-si (KR); Soon Ryung Lee, Anyang-si (KR); Bong Yeon Choi, Yongin-si (KR)

(73) Assignees: Samsung Electronics Co., Ltd., Suwon-si (KR); Research & Business Foundation Sungkyunkwan University, Suwon-si (KR)

( * ) Notice: Subject to any disclaimer, the term of this patent is extended or adjusted under 35 U.S.C. 154(b) by 0 days.

(21) Appl. No.: 16/659,823

(22) Filed: Oct. 22, 2019

(65) Prior Publication Data
US 2020/0052504 A1 Feb. 13, 2020

Related U.S. Application Data

(63) Continuation of application No. 14/872,696, filed on Oct. 1, 2015, now Pat. No. 10,615,611.

(30) Foreign Application Priority Data

Oct. 23, 2014 (KR) ........................ 10-2014-0144496

(51) Int. Cl.
*H02J 7/00* (2006.01)
*B60L 58/22* (2019.01)

(52) U.S. Cl.
CPC ............ *H02J 7/0018* (2013.01); *B60L 58/22* (2019.02); *B60L 2210/12* (2013.01);
(Continued)

(58) Field of Classification Search
CPC ........ H02J 7/0068; H02J 7/0013; B60L 58/22
(Continued)

(56) References Cited

U.S. PATENT DOCUMENTS 6,204,633 B1  3/2001  Kitagawa
6,275,004 B1  8/2001  Tamai et al.
(Continued)

FOREIGN PATENT DOCUMENTS

JP  2007-174841 A  7/2007
JP  2010-115048 A  5/2010
(Continued)

OTHER PUBLICATIONS

Koren Office Action dated Dec. 16, 2020 in corresponding Korean Patent Application No. 10-2014-0144496. (3 pages in English and 6 pages in Korean).

*Primary Examiner* — David V Henze-Gongola
(74) *Attorney, Agent, or Firm* — NSIP Law

(57) ABSTRACT

A battery charging and discharging apparatus includes power converters connected in series and configured to convert respective output voltages of batteries corresponding to the power converters. Each of the power converters may include direct current to direct current (DC/DC) converters connected in parallel. The apparatus may further include a controller configured to control magnitudes of respective output voltages of the power converters based on respective states of the batteries.

10 Claims, 5 Drawing Sheets

(52) U.S. Cl.
CPC ........ *B60L 2210/14* (2013.01); *H02J 7/00711* (2020.01); *H02J 2007/0067* (2013.01); *H02J 2207/20* (2020.01); *Y02T 10/70* (2013.01); *Y02T 10/72* (2013.01); *Y02T 10/92* (2013.01)

(58) Field of Classification Search
USPC ................. 320/116–119, 112, 124, 137, 140
See application file for complete search history.

(56) References Cited

U.S. PATENT DOCUMENTS

| | | | |
|---|---|---|---|
| 6,795,322 B2 | 9/2004 | Aihara et al. | |
| 6,954,365 B2* | 10/2005 | Deguchi | H01M 8/04917 363/65 |
| 7,282,814 B2 | 10/2007 | Jacobs | |
| 7,619,323 B2* | 11/2009 | Tan | H02J 1/10 307/82 |
| 8,129,952 B2* | 3/2012 | Lee | H02J 7/0016 320/140 |
| 8,354,825 B2 | 1/2013 | Lee et al. | |
| 8,541,905 B2 | 9/2013 | Brabec | |
| 8,798,832 B2* | 8/2014 | Kawahara | B60L 50/61 701/22 |
| 8,963,501 B2* | 2/2015 | Shigemizu | H01M 10/441 320/126 |
| 9,444,275 B2 | 9/2016 | Huang et al. | |
| 9,548,619 B2 | 1/2017 | Gazit | |
| 2005/0194937 A1* | 9/2005 | Jacobs | H02J 7/0018 320/135 |
| 2009/0058329 A1* | 3/2009 | Ichikawa | B60W 10/08 318/139 |
| 2010/0117593 A1* | 5/2010 | Piccard | H02J 7/342 320/104 |
| 2011/0089898 A1 | 4/2011 | Lee et al. | |
| 2012/0086390 A1 | 4/2012 | Lim et al. | |
| 2012/0274145 A1* | 11/2012 | Taddeo | H01M 10/441 307/82 |
| 2012/0319652 A1 | 12/2012 | Namou et al. | |
| 2013/0038289 A1* | 2/2013 | Tse | H02M 3/1584 320/118 |
| 2013/0193768 A1 | 8/2013 | Iwasaki et al. | |
| 2013/0257146 A1* | 10/2013 | Nojima | B60L 53/65 307/9.1 |
| 2014/0009106 A1* | 1/2014 | Andrea | H02J 7/0018 320/107 |
| 2014/0312844 A1* | 10/2014 | Mercier | H02J 2207/20 320/118 |
| 2014/0320083 A1 | 10/2014 | Masuda et al. | |
| 2016/0190940 A1* | 6/2016 | Yan | H02M 3/285 363/17 |

FOREIGN PATENT DOCUMENTS

| | | |
|---|---|---|
| JP | 2010-213474 A | 9/2010 |
| JP | 2012-65434 A | 3/2012 |
| JP | 5351952 B1 | 11/2013 |
| JP | 5398629 B2 | 1/2014 |
| JP | 2014-102890 A | 6/2014 |
| KR | 10-2012-0006999 A | 1/2012 |
| KR | 10-112259 B1 | 3/2012 |

* cited by examiner

APPARATUS FOR CHARGING AND DISCHARGING BATTERY

CROSS-REFERENCE TO RELATED APPLICATION(S)

This application is a continuation of U.S. patent application Ser. No. 14/872,696 filed on Oct. 1, 2015 which claims the benefit under 35 USC 119(a) of Korean Patent Application No. 10-2014-0144496 filed on Oct. 23, 2014, in the Korean Intellectual Property Office, the entire disclosure of which is incorporated herein by reference for all purposes.

BACKGROUND

1. Field

The following description relates to an apparatus for charging and discharging a battery.

2. Description of Related Art

A method of managing batteries more accurately and effectively is important for technology for handling environmental and energy resources issues regarding electric automobiles and electric bicycles. However, a technical issue may arise in supplying a stored amount of energy to a load such as an electric motor due to a structure of cells or modules of a battery. In addition, when the cells of the battery are charged and discharged repetitively, a voltage deviation may occur among the cells and a certain cell may be overcharged or over-discharged. Thus, a capacity and a lifespan of the battery may be reduced due to deterioration of the battery.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a battery charging and discharging apparatus includes power converters connected in series and configured to convert respective output voltages of batteries corresponding to the power converters.

Each of the power converters may include direct current to direct current (DC/DC) converters connected in parallel.

First terminals of the DC/DC converters of each of the power converters may be connected in parallel with each other and may be connected to a corresponding one of the batteries; and second terminals of the DC/DC converters of each of the power converters may be connected in parallel with each other and may be connected to an output terminal of a corresponding one of the power converters.

The apparatus may further include a controller configured to control magnitudes of respective output voltages of the power converters based on respective states of the batteries.

The controller may be further configured to control the magnitudes of the respective output voltages of the power converters based on either one or both of respective states of charge (SOCs) and respective states of health (SOHs) of the batteries.

The controller may be further configured to control the output voltage of one of the power converters to increase in response to a corresponding one of the batteries having a greater SOC among the batteries.

The controller may be further configured to control the magnitude of the output voltage of each of the power converters based on an overall SOC and an overall SOH of all of the batteries and an SOC and an SOH of a corresponding one of the batteries.

The controller may be further configured to calculate a respective compensation value for each of the power converters based on a difference between a maximum value and a minimum value of respective SOCs of the batteries, and control the magnitude of the output voltage of each of the power converters based on the respective compensation value.

The controller may be further configured to set the respective compensation value for each of the power converters so that a total amount of power output from the power converters to remains constant.

The controller may be further configured to set the respective compensation value for each of the power converters so that the greater the SOC of the corresponding one of the batteries, the greater an amount of power output from the power converter.

The apparatus may further include power converter controllers respectively corresponding to the power converters and configured to control, under control of the controller, respective ones of the power converters to control the magnitudes of the respective output voltages of the power converters under control of the controller.

Each of the power converters may include a first DC/DC converter and a second DC/DC converter; a first input terminal of the first DC/DC converter and a first input terminal of the second DC/DC converter may be connected to a first terminal of a corresponding one of the batteries; a second input terminal of the first DC/DC converter and a second input terminal of the second DC/DC converter may be connected to a second terminal of the corresponding one of the batteries; a first output terminal of the first DC/DC converter may be connected to a first output terminal of the second DC/DC converter; and a second output terminal of the first DC/DC converter and a second output terminal of the second DC/DC converter may be connected to each other and to a first output terminal of a first DC/DC converter and a first output terminal of a second DC/DC converter of a neighboring one of the power converters.

Each of the power converters may further include a power converter controller configured to control a phase difference between a first control signal to control the first DC/DC converter and a second control signal to control the second DC/DC converter to be 180°.

The power converters may be connected to an external component of the battery charging and discharging apparatus; and the power converters may be further configured to supply power of the batteries to the external component in response to the external component being a load.

The power converters may be connected to an external component of the battery charging and discharging apparatus; and the power converters may be further configured to charge the batteries with power from the external component in response to the external component being a power source.

In another general aspect, a power supply apparatus includes direct current to direct current (DC/DC) converters connected in parallel and connected to a battery module; and the DC/DC converters are configured to convert a first voltage of the battery module to a second voltage to be controlled by a controller.

The DC/DC converters may be connected in parallel with each other and may be connected in series to DC/DC converters of a neighboring power supply apparatus.

The DC/DC converters may be connected to an external component of the power supply apparatus; and DC/DC converters may be further configured to supply power of the battery module to the external component in response to the external component being a load.

The DC/DC converters may be connected to an external component of the power supply apparatus; and the DC/DC converters may be further configured to charge the battery module with power from the external component in response to the external component being a power source.

A magnitude of the second voltage may be controlled based on either one or both of states of charge (SOCs) and states of health (SOHs) of battery modules of power supply apparatuses to be controlled by the controller.

A magnitude of the second voltage may be controlled based on an SOC and an SOH of the battery module, and an overall SOC and an overall SOH of all of battery modules of power supply apparatuses to be controlled by the controller.

The magnitude of the second voltage may be further controlled based on a compensation value calculated based on a difference between a maximum value and a minimum value of SOCs of the battery modules of the power supply apparatuses.

The compensation value may be set so that a total amount of power to be output from the power supply apparatuses remains constant.

The compensation value may be set so that the greater the SOC of the battery module to which the DC/DC converters are connected, the greater an amount of power output from the DC/DC converters.

The apparatus may further include a power converter controller configured to control, under control of the controller, the DC/DC converters to convert the first voltage of the battery module to the second voltage.

In another general aspect, a power supply apparatus includes power converters connected in series to supply an output voltage to a load; and a controller configured to control the power converters to convert respective output voltages of batteries corresponding to the power converters to the output voltage so that each of the power converters supplies an amount of power to the load that depends on a state of charge (SOC) of the corresponding battery.

The controller may be further configured to control each of the power converters so that the greater the SOC of the corresponding battery, the greater the amount of power supplied to the load by the power converter.

The controller may be further configured to control each of the power converters so that the amount of power supplied by each of the power converters to the load increases as the SOC of the corresponding battery increases relative to a sum of the SOCs of all of the batteries, and decreases as the SOC of the corresponding battery decreases relative to the sum of the SOCs of all of the batteries.

The controller may be further configured to control the power converters so that a total amount of power supplied to the load by the power converters remains constant.

The SOC of each of the batteries may be an SOC of the battery multiplied by a state of health (SOH) of the battery.

The controller may be further configured to calculate a respective output voltage of each of the power converters based on an SOC of the corresponding battery, a state of health (SOH) of the corresponding battery, an overall SOC of all of the batteries, and an overall SOH of all of the batteries, and control each of the power converters to output the calculated respective output voltage; and the output voltage supplied to the load may be a sum of the respective output voltages of the power converters.

The controller may be further configured to calculate a respective voltage of each of the power converters based on a difference between a maximum SOC and a minimum SOC among the SOCs of all of the batteries, and control each of the power converters to output the calculated respective output voltage; and the output voltage supplied to the load may be a sum of the respective output voltages of the power converters.

The controller may be further configured to calculate a respective output voltage of each of the power converters based on a compensation factor that depends on a total number of all of the power converters and an order of the power converter in a list of all of the power converters ranked in a descending order of the SOCs of the corresponding batteries.

The apparatus may further include power converter controllers respectively corresponding to the power converters and configured to control, under control of the controller, respective ones of the power converters to convert the respective output voltages of the batteries corresponding to the power converters to the output voltage so that each of the power converters supplies the amount of power to the load that depends on the SOC of the corresponding battery.

Other features and aspects will be apparent from the following detailed description, the drawings, and the claims.

DETAILED DESCRIPTION

Figure 1:
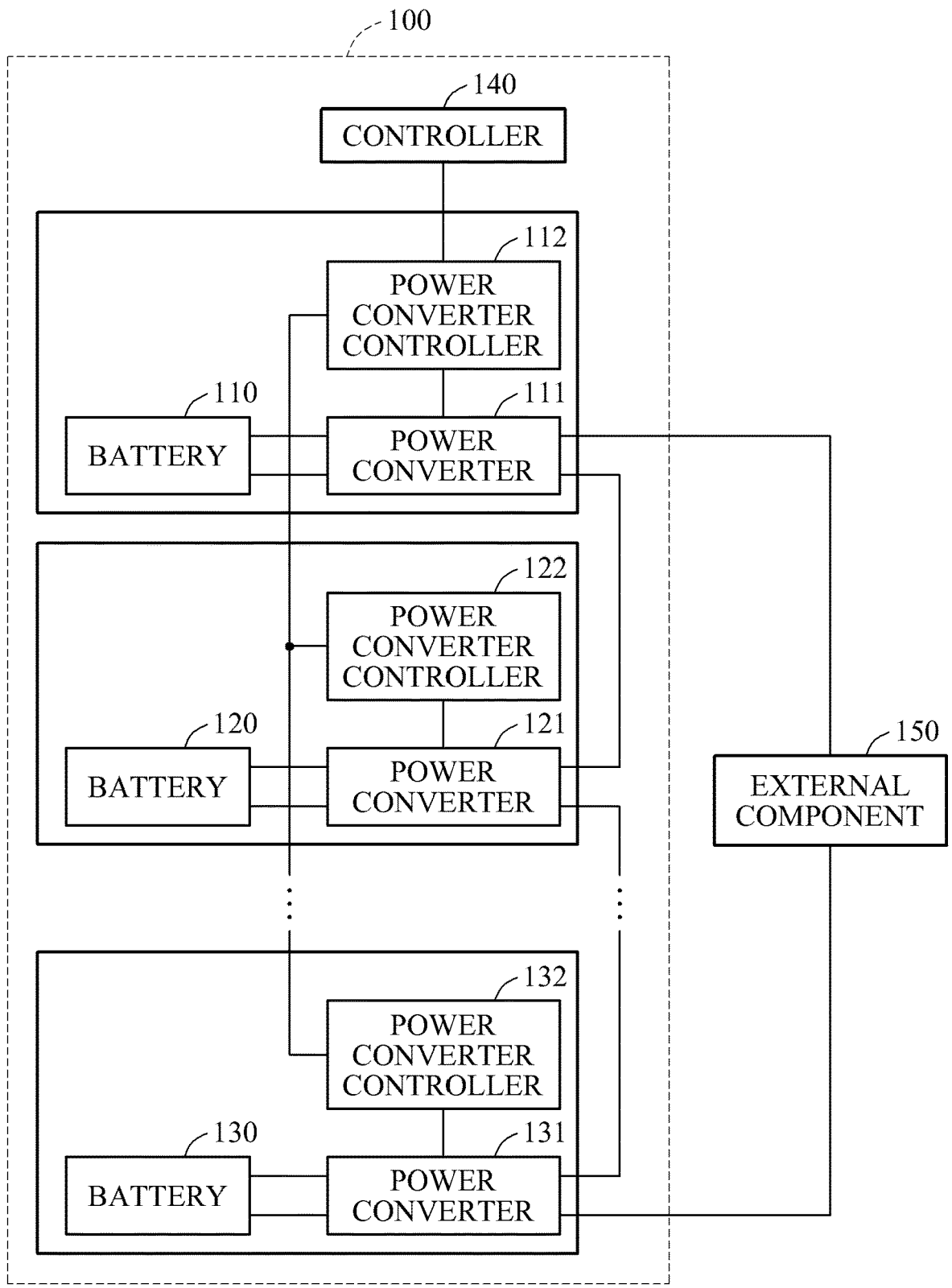
FIG. 1 illustrates an example of a battery charging and discharging apparatus.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

The terminology used herein is for the purpose of describing particular examples only, and is not intended to limit the scope of the disclosure in any way. As used herein, the singular forms "a," "an," and "the" are intended to include the plural forms as well, unless the context clearly indicates otherwise. It will be further understood that the terms "include" and/or "have," when used in this specification, specify the presence of stated features, numbers, operations, elements, components, or combinations thereof, but do not preclude the presence or addition of one or more other features, numbers, operations, elements, components, or combinations thereof.

Unless otherwise defined, all terms, including technical and scientific terms, used herein have the same meaning as commonly understood by one of ordinary skill in the art to which this description pertains. It will be further understood that terms, such as those defined in commonly used dictionaries, should be interpreted as having a meaning that is consistent with their meaning in the context of the relevant art, and are not to be interpreted in an idealized or overly formal sense unless expressly so defined herein.

FIG. illustrates an example of a battery charging and discharging apparatus 100.

Referring to FIG. 1, the battery charging and discharging apparatus 100 includes a plurality of batteries, for example, a battery 110, a battery 120, and a battery 130, a plurality of power converters, for example, a power converter 111, a power converter 121, and a power converter 131, a plurality of power converter controllers, for example, a power converter controller 112, a power converter controller 122, and a power converter controller 132. The battery charging and discharging apparatus 100 further includes a controller 140.

The battery charging and discharging apparatus 100 may be a battery charging apparatus that charges the batteries 110, 120, and 130 from an external power source, or a battery discharging apparatus that supplies power to a load from the batteries 110, 120, and 130. Alternatively, the battery charging and discharging apparatus 100 may be an apparatus that performs both a function of the battery charging apparatus and a function of the battery discharging apparatus. For example, the battery charging and discharging apparatus 100 may be an energy storage system (ESS).

Each of the batteries 110, 120, and 130 may be a battery module or a battery cell. The battery module may include a plurality of battery cells. The battery cells included in the battery module may be connected in series. Each of the batteries 110, 120, and 130 may be a secondary battery, such as a lithium-ion battery. Capacities or voltages of the batteries 110, 120, and 130 may be the same, or may be different.

The batteries 110, 120, and 130 may supply power to an external component 150 connected to the battery charging and discharging apparatus 100 and receive power from the external component 150 through the power converters 111, 121, and 131. The external component 150 may be a device located outside the battery charging and discharging apparatus 100. For example, the external component 150 may be a load to receive power from the batteries 110, 120, and 130, or a power source to supply power to the batteries 110, 120, and 130.

The power converters 111, 121, and 131 output voltages by converting respective output voltages of the batteries 110, 120, and 130. For example, the power converter 111 converts an output voltage of the battery 110, and outputs an output voltage obtained by converting the output voltage of the battery 110. Similarly, the power converter 121 and the power converter 131 convert output voltages of the battery 120 and the battery 130, respectively, and output voltages obtained by converting the output voltages of the battery 120 and the battery 130, respectively. A voltage output from each of the power converters 111, 121, and 131 is controlled by the controller 140 via the power converter controllers 112, 122, and 132, and the respective output voltages of the power converters 111, 121, and 131 may be the same, or may be different. Hereinafter, for ease of description, a statement that the controller 140 controls an output voltage of a power converter is to be interpreted as a statement that the controller 140 controls the output of the power converter via a respective power converter controller.

Figure 2:
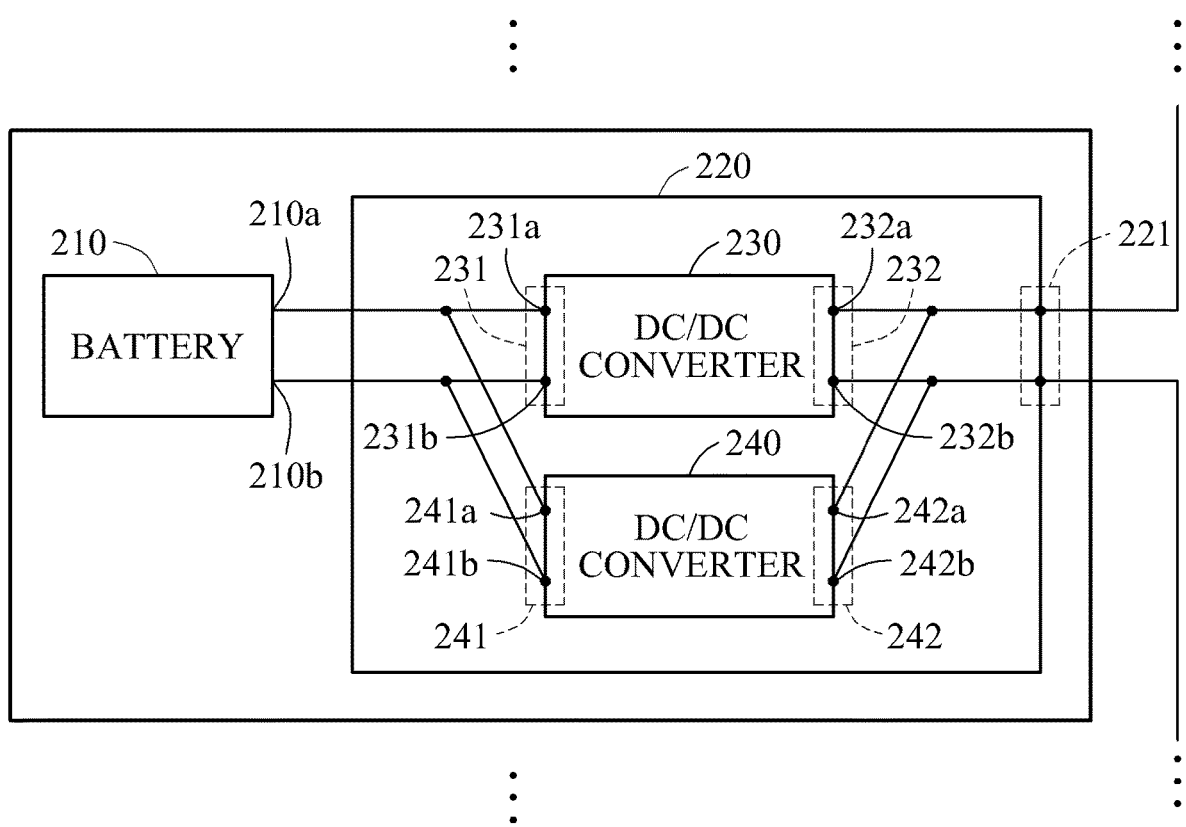
FIG. 2 illustrates an example of a connection between a battery and a power converter.
Figure 3:
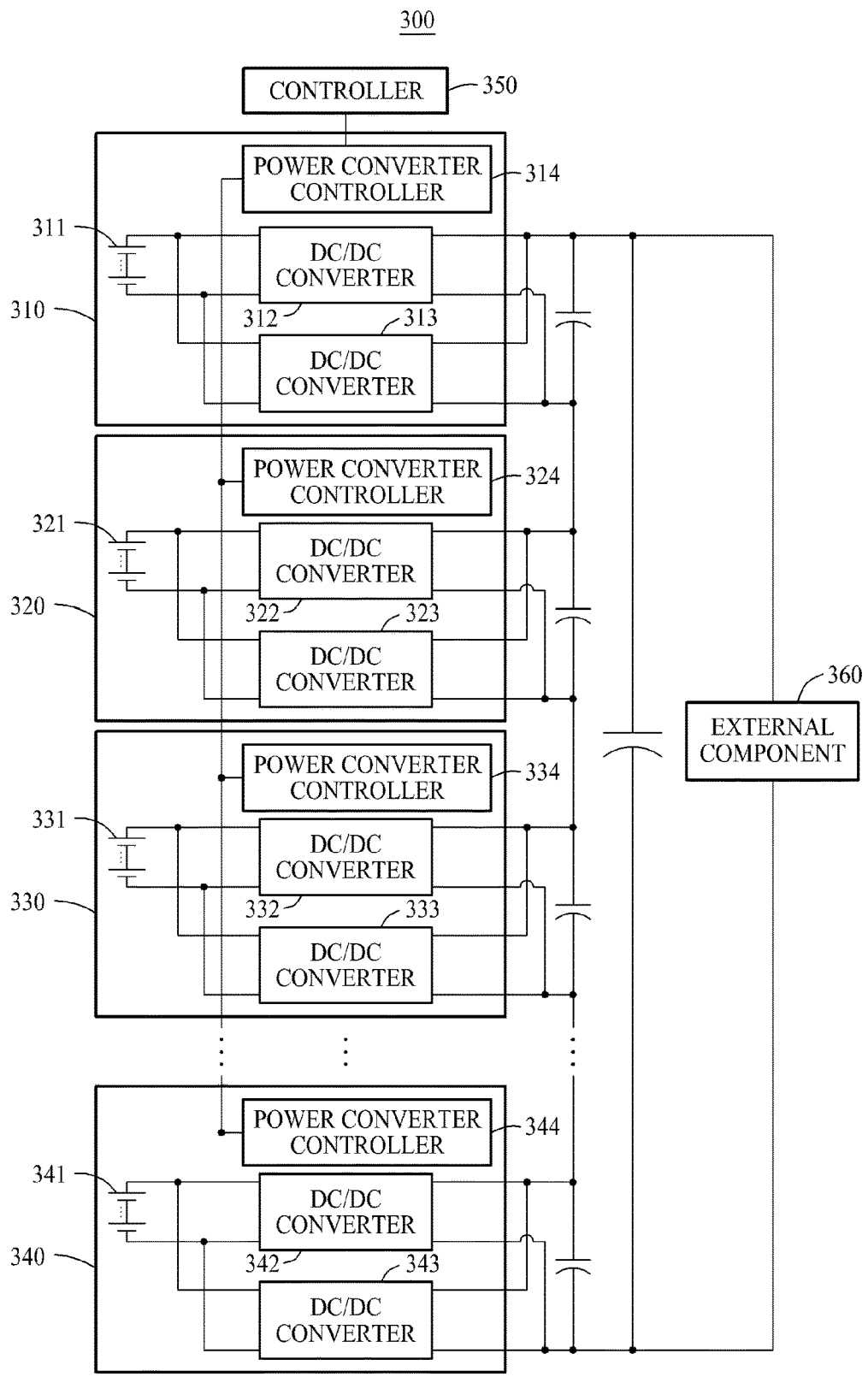
FIG. 3 illustrates an example of a battery system.
Figure 4:
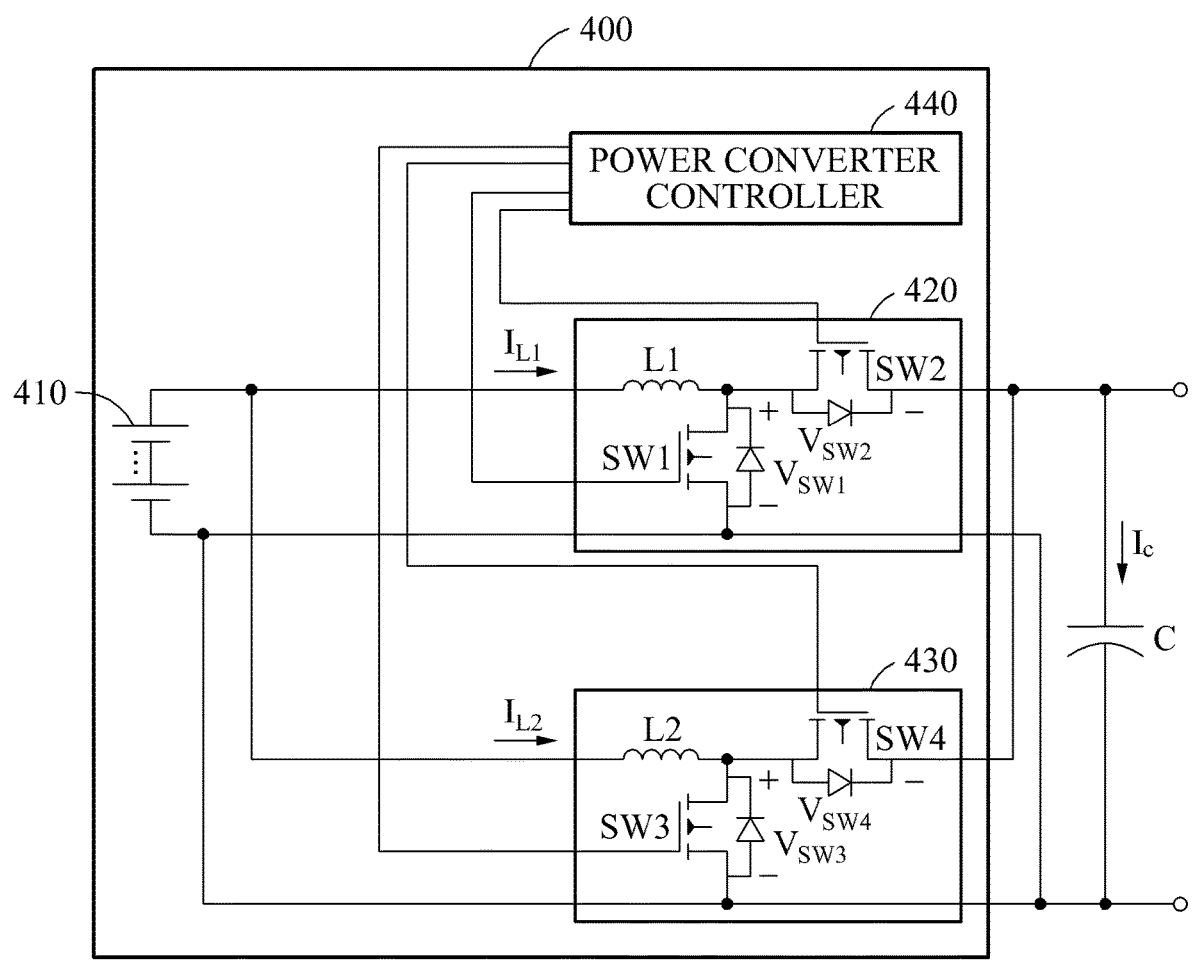
FIG. 4 illustrates an example of an operation of direct current to direct current (DC/DC) converters.

Each of the power converters 111, 121, and 131 may include a plurality of direct current to direct current (DC/DC) converters (not shown in FIG. 1, but shown in FIGS. 2 through 4). The DC/DC converters included in a power converter may be connected in parallel.

As illustrated in FIG. 1, the power converters 111, 121, and 131 are connected in series. The power converter 111 is connected to the power converter 121, and the power converter 121 is connected to a subsequent power converter. The power converters 111, 121, and 131 connected in series are connected to the external component 150. In one example, when the external component 150 is a load, the power converters 111, 121, and 131 supply power of the batteries 110, 120, and 130 to the load. The power converters 111, 121, and 131 supply the power of the batteries 110, 120, and 130 by converting the output voltages of the batteries 110, 120, and 130 and supplying output voltages obtained by converting the output voltages of the batteries 110, 120, and 130 to the load. In another example, when the external component 150 is a power source, the power converters 111, 121, and 131 supply power to the batteries 110, 120, and 130 from the power source. Thus, the power converters 111, 121, and 131 charge the batteries 110, 120, and 130 using the power source. The power converters 111, 121, and 131 supply the batteries 110, 120, and 130 with the power from the power source by converting an output voltage of the power source and supplying an output voltage obtained by converting the output voltage of the power source to the batteries 110, 120, and 130.

For ease of description, the external component 150 is assumed to be the load in the example of FIG. 1. However, the following description is not limited to such an assumption, and thus the descriptions are also applicable to an assumption that the external component 150 is the power source.

The controller 140 is a device that controls a magnitude of an output voltage of a power converter. For example, the controller 140 controls the output voltages of the power converters 111, 121, and 131 based on respective states of the batteries 110, 120, and 130. The controller 140 controls the output voltages of the power converters 111, 121, and 131 by controlling DC/DC converters included in each of the power converters 111, 121, and 131 via the power converter controllers 112, 122, and 132.

The controller 140 may be a battery management system (BMS) to manage the batteries 110, 120, and 130. For example, the controller 140 may perform thermal control of the batteries 110, 120, and 130. In addition, the controller 140 may equalize respective states of charge (SOCs) of the batteries 110, 120, and 130 by preventing the batteries 110, 120, and 130 from being overcharged and over-discharged and performing balancing among the batteries 110, 120, and 130. A state of each battery includes an SOC, a state of health (SOH), and a state of function (SOF).

In addition, the controller 140 may estimate the SOC, the SOH, and the SOF of each battery. The SOC is information on an amount of charge stored in a battery. The SOH is a degree of deterioration in a performance of a battery compared to an initial performance of the battery when it was manufactured, The SOF is information on a degree to which a performance of a battery satisfies a predetermined condition.

The controller 140 may provide the SOC, the SOH, and the SOF to an electronic control unit (ECU). For example, the controller 140 may communicate with the ECU through a controller area network (CAN).

In one example, the controller 140 verifies the states of the batteries 110, 120, and 130, and determines the output voltages of the power converters 111, 121, and 131 based on the verified states of the batteries 110, 120, and 130. For example, the controller 140 may verify the states of the batteries 110, 120, and 130 via connections between the controller 140 and the batteries 110, 120, and 130 (not shown in FIG. 1 for simplicity). The controller 140 transmits the determined output voltages of the power converters 111, 121, and 131 to the power converter controller 112. The power converter controller 112 is a first power converter controller among the power converter controllers 112, 122, and 132, and is connected to the controller 140. The power converter controller 112 transmits output voltages of the other power converters, for example, the power converter 121 and the power converter 131, to the other power controllers, for example, the power converter controller 122 and the power converter controller 132. The power converter controller 112 synchronizes operations of the power converters 111, 121, and 131 included in the battery charging and discharging apparatus 100. The power converter controller 112 operates as a master power converter controller.

The controller 140 controls the magnitudes of the output voltages of the power converters 111, 121, and 131 based on either one or both of the respective SOCs and SOHs of the batteries 110, 120, and 130. The controller 140 controls an output voltage of a power converter to be controlled by the controller 140 based on the states of the batteries 110, 120, and 130 and a state of a battery corresponding to the power converter to be controlled. For example, when the controller 140 controls the power converter 111, the controller 140 controls an output voltage of the power converter 111 based on the states of all of the batteries 110, 120, and 130 and a state of the battery 110 connected to the power converter 111.

The greater the SOC of a battery, the greater the controller 140 controls a voltage output from a power converter corresponding to the battery to be, and the smaller the SOC of the battery, the smaller the controller 140 controls the voltage output from the power converter corresponding to the battery to be. For example, when the SOC of the battery 110 is greater than the SOC of the battery 120 and the SOC of the battery 120 is greater than the SOC of the battery 130, the controller 140 controls the power converter 111 to output a voltage greater than the output voltage of the power converter 121, and controls the power converter 121 to output a voltage greater than the output voltage of the power converter 131.

The controller 140 controls a magnitude of an output voltage of a power converter connected to a corresponding battery based on an overall SOC and an overall SOH of the batteries 110, 120, and 130, and an SOC and an SOH of the corresponding battery. The overall SOC is a sum of the SOCs of all of the batteries 110, 120, and 130, and the overall SOH is a sum of the SOHs of all of the batteries 110, 120, and 130. The corresponding battery is a battery corresponding to the power converter to be controlled by the controller 140.

The controller 140 calculates a compensation value based on a difference between a maximum value and a minimum value of the SOCs of the batteries 110, 120, and 130, and controls the magnitude of the output voltage of the power converter connected to the corresponding battery based on the compensation value. That is, the controller 140 controls the magnitude of the output voltage of the power converter connected to the corresponding battery based on the overall SOC and the overall SOH of the batteries 110, 120, and 130, the SOC and the SOH of the corresponding battery, and the compensation value. The controller 140 sets the compensation value so that a total amount of power output from the power converters 111, 121, and 131 remains constant.

The controller 140 may set different compensation values for the power converters 111, 121, and 131. A total sum of the different compensation values set by the controller 140 is "0." When the SOCs of the batteries 110, 120, and 130 are arranged in numerical order, magnitudes of the different compensation values will have a bisymmetrical form, and signs of compensation values on right and left sides of a center compensation value will differ.

For example, when one battery has a greater SOC than another battery, the controller 140 sets compensation values for the two power converters connected to the two batteries o cause power output from the power converter connected to the battery having the greater SOC to be greater than power output from the power converter connected to the battery having the smaller SOC. In the example of FIG. 1, when the SOC of the battery 110 is greater than the SOC of the battery 120 and the SOC of the battery 120 is greater than the SOC of the battery 130, the controller 140 sets the compensation values for the power converter 111 connected to the battery 110 and the power converter 121 connected to the battery 120 to cause power output from the power converter 111 connected to the battery 110 to be greater than power output from the power converter 121 connected to the battery 120. Similarly, the controller 140 sets the compensation values for the power converter 121 connected to the battery 120 and the power converter 131 connected to the battery 130 to cause the power output from the power converter 121 connected to the battery 120 to be greater than power output from the power converter 131 connected to the battery 130. Thus, the controller 140 controls the power converters 111, 121, and 131 to convert respective output voltages of the batteries 110, 120, and 130 corresponding to the power converters 111, 121, and 131 to respective output voltages of the power converters 111, 121, and 131 so that each of the power converters 111, 121, and 131 supplies an amount of power to the external component 150 that depends on the SOC of the corresponding one of the batteries 110, 120, and 130.

FIG. 2 illustrates an example of a connection between a battery 210 and a power converter 220.

FIG. 2 illustrates the battery 210 and the power converter 220 corresponding to the battery 210 among batteries and power converters included in a battery charging and discharging apparatus, such as the battery charging and discharging apparatus of FIG. 1. In the example of FIG. 2, the power converter 220 includes two DC/DC converters. However, this example is provided only for ease of description, and the power converter 220 may include any number of DC/DC converters.

Referring to FIG. 2, the battery 210 corresponds to the power converter 220. The battery 210 may be a battery module or a battery cell. The battery module may include a plurality of battery cells connected in series.

The power converter 220 includes a plurality of DC/DC converters, for example, a DC/DC converter 230 and a DC/DC converter 240, which may be provided in an interleaved form or a layered structure. The interleaved form is a structure in which a plurality of DC/DC converters included in a power converter are connected in parallel with one another with a phase difference therebetween. Such a form reduces ripples of an output current of the power converter. A multiphase interleaved form may distribute a current flowing in a power converter and reduce ripples of the current. For example, when two DC/DC converters are included in a power converter, the two DC/DC converters may be connected in parallel and have a phase difference of 180° therebetween. The layered structure is a form that may be shown due to parallel connection between a plurality of DC/DC converters included in a power converter.

The DC/DC converters 230 and 240 are connected in parallel. A first terminal 231 of the DC/DC converter 230 and a first terminal 241 of the DC/DC converter 240 are connected in parallel. The first terminal 231 of the DC/DC converter 230 and the first terminal 241 of the DC/DC converter 240 connected in parallel are connected to the battery 210. That is, the first terminal 231 of the DC/DC converter 230 and the first terminal 241 of the DC/DC converter 240 are connected in parallel and are connected to the battery 210. Similarly, a second terminal 232 of the DC/DC converter 230 and a second terminal 242 of the DC/DC converter 240 are connected in parallel and are connected to an output terminal 221 of the power converter 220.

A first input terminal 231a of the DC/DC converter 230 and a first input terminal 241a of the DC/DC converter 240 are connected to a first terminal 210a of the battery 210. Similarly, a second input terminal 231b of the DC/DC converter 230 and a second input terminal 241b of the DC/DC converter 240 are connected to a second terminal 210b of the battery 210.

When the power converter 220 is not a first power converter located at a first position in the battery charging and discharging apparatus, like the power converter 121 in FIG. 1, a first output terminal 232a of the DC/DC converter 230 and a first output terminal 242a of the DC/DC converter 240 are connected in parallel and are connected to second output terminals of DC/DC converters included in a preceding power converter, like the power converter 111 in FIG. 1. However, when the power converter 220 is the first power converter located at the first position in the battery charging and discharging apparatus, like the power converter 111 in FIG. 1, the first output terminal 232a of the DC/DC converter 230 and the first output terminal 242a of the DC/DC converter 240 are connected to an external component, like the external component 150 in FIG. 1.

Also, when the power converter 220 is not a last power converter located at a last position in the battery charging and discharging apparatus, like the power converter 121 in FIG. 1, a second output terminal 232b of the DC/DC converter 230 and a second output terminal 242b of the DC/DC converter 240 are connected in parallel and are connected to first output terminals of the DC/DC converters included in a succeeding power converter, like the power converter 131 in FIG. 1. However, when the power converter 220 is the last power converter located at the last position in the battery charging and discharging apparatus, like the power converter 131 in FIG. 1, the second output terminal 232b of the DC/DC converter 230 and the second output terminal 242b of the DC/DC converter 240 are connected in parallel and are connected to the external component, like the external component 150 in FIG. 1.

Thus, the output terminal 221 of the power converter 220 is connected in series to an output terminal of the neighboring power converter to supply power of the battery 210 to the external component.

A power converter controller (not shown in FIG. 2 for ease of description, but shown in FIGS. 1, 3, and 4) controls operations of the DC/DC converter 230 and the DC/DC converter 240 through a control signal controlling the DC/DC converter 230 and a control signal controlling the DC/DC converter 240. For example, the power converter controller controls a phase difference between the control signal controlling the DC/DC converter 230 and the control signal controlling the DC/DC converter 240 to be 180°. When the power converter 220 includes n DC/DC converters, the power converter controller may control the phase difference between control signals controlling the n DC/DC converters to be $$\frac{360°}{n}.$$

The control signals controlling the DC/DC converter 230 and the DC/DC converter 240 may be control signals to control respective switches included in the DC/DC converter 230 and the DC/DC converter 240 (not shown in FIG. 2 for ease of description, but shown in FIG. 4). For example, the signals may be pulse waveforms having periodic intervals as will described below with respect to FIG. 5.

FIG. 3 illustrates an example of a battery system 300.

Referring to FIG. 3, the battery system 300 includes a plurality of power supply apparatuses, for example, a power supply apparatus 310, a power supply apparatus 320, a power supply apparatus 330, and a power supply apparatus 340, a controller 350, and an external component 360. The power supply apparatuses 310 through 340 exchange power between the external component 360 and respective batteries, for example, a battery 311, a battery 321, a battery 331, and a battery 341. For example, the power supply apparatus 310 includes the battery 311, a plurality of DC/DC converters, for example, a DC/DC converter 312 and a DC/DC converter 313, and a power converter controller 314. A pair of the DC/DC converters 312 and 313 may be included in each of the power converters 111, 121, and 131 in FIG. 1. In the example of FIG. 3, two DC/DC converters correspond to a single battery. However, the example is provided for ease of description, and one battery may correspond to any number of DC/DC converters.

Each of the batteries 311 through 341 may be a battery module or a battery cell. The battery model may include a plurality of battery cells connected in series. Each of the batteries 311 through 341 may be a secondary battery, such as a lithium-ion battery. Capacities or voltages of the batteries 311 through 341 may be the same, or may be different.

A plurality of DC/DC converters, for example, the DC/DC converter 312, the DC/DC converter 313, a DC/DC converter 322, a DC/DC converter 323, a DC/DC converter 332, a DC/DC converter 333, a DC/DC converter 342, and a DC/DC converter 343 convert respective output voltages of the batteries 311 through 341 to an output voltage. For example, each of the DC/DC converters 312 through 343 may be a non-isolated step-up converter. Respective output voltages of the DC/DC converters 312 through 343 are controlled by the controller 350 via the power converter controller 314, a power converter controller 324, a power converter controller 334, and a power converter controller 344. The output voltages of the DC/DC converters 312 through 343 may have different magnitudes. Hereinafter, for ease of description, a statement that the controller 350 controls an output voltage of a DC/DC converter is to be interpreted as a statement that the controller 350 controls the output of the DC/DC converter via a respective power converter controller. Capacitors connected to respective output terminals of the DC/DC converters 312 through 343 store power of respective output voltages of the DC/DC converters 312 through 343.

In an example of the pair of the DC/DC converters 312 and 313, the DC/DC converters 312 and 313 convert a first voltage of the battery 311 to a second voltage controlled by the controller 350. The first voltage may correspond to an output voltage of a corresponding battery described with reference to FIG. 1, and the second voltage may correspond to an output voltage of a corresponding power converter described with reference to FIG. 1.

The controller 350 controls magnitudes of the output voltages of the DC/DC converters 312 through 343, and may be a BMS that manages the batteries 311 through 341. For example, the controller 350 controls the magnitudes of the output voltages of the DC/DC converters 312 through 343 based on respective states of the batteries 311 through 341.

The controller 350 verifies the states of the batteries 311 through 341 and determines the output voltages of the DC/DC converters 312 through 343 based on the verified states of the batteries 311 through 341. For example, the controller 350 may verify the states of the batteries 311 through 341 via connections between the controller 350 and the batteries 311 through 341 (not shown in FIG. 1 for simplicity). The controller 350 transmits the determined output voltages of the DC/DC converters 312 through 343 to the power converter controller 314. The power converter controller 314 is a first power converter controller among the power converter controllers 314 through 344, and operates as a master power converter controller. The power converter controller 314 transmits the determined output voltages of the DC/DC converters 313 through 343 to the power converter controllers 324 through 344, and synchronizes operations of the DC/DC converters 312 through 343.

The controller 350 controls the output voltages of the DC/DC converters 312 through 343 in accordance with Equation 1 below.

$$V_{ref\_i} = \frac{SOC_h(i)}{\sum_{i=1}^{i=N} SOC_h(i)} V_{DC\_Link} + SOC_{diff} * k(i) \quad (1)$$

In Equation 1, "$V_{ref\_i}$" denotes an output voltage of DC/DC converters corresponding to an i-th battery. The i-th battery is a battery having an i-th largest value of an SOC when the batteries 311 through 341 are arranged in numerical order of their SOCs. "$SOC_{h(i)}$" denotes an SOC of the i-th battery in which an SOH of the i-th battery is reflected, and "$V_{DC\_Link}$" denotes an output voltage of the battery system 300, which is a total voltage to be supplied to the external component 360. "$SOC_{diff}$" denotes a difference between a maximum value and a minimum value of the SOCs of the batteries 311 through 341, and "k(i)" denotes a compensation factor corresponding to the i-th battery. "N" denotes a number of the batteries 311 through 341 included in the battery system 300.

$SOC_{h(i)}$ is expressed by Equation 2 below.

$$SOC_h(i) = SOC(i) * SOH(i) \quad (2)$$

In Equation 2, "SOC(i)" and "SOH(i)" respectively denote the SOC and the SOH of the i-th battery.

"$SOC_{diff} * k(i)$" denotes a feedforward compensation of the i-th battery. Since $SOC_{diff}$ denotes the difference between the maximum value and the minimum value of the SOCs of the batteries 311 through 341, a value of $SOC_{diff}$ to be applied to each of the batteries 311 through 341 is the same. A range of $SOC_{diff}$ may be restricted to protect the batteries 311 through 341. The $SOC_{diff}$ may be restricted to cause the output voltages of the DC/DC converters to remain within a predetermined range. For example, the controller 350 may restrict the $SOC_{diff}$ to cause the output voltages of the DC/DC converters to be not greater than an upper limit value and not less than a lower limit value.

The compensation factor k(i) is expressed by Equation 3 below.

$$k(i) = \begin{cases} \frac{N}{2} - i & \left(\text{if } \frac{N}{2} \geq i\right) \\ 0 & \left(\text{if } \frac{N+1}{2} = i\right) \\ \frac{N}{2} + 1 - i & \left(\text{if } \frac{N}{2} < i\right) \end{cases} \quad (3)$$

In Equation 3, when values of k(i) calculated based on Equation 3 are arranged in numerical order of i, the values of k(i) have a bisymmetrical form. The values of k(i) have bisymmetrically different signs. A sum of the values of the k(i) is "0."

Thus, a total amount of power output from the DC/DC converters 312 through 343 and supplied to the external component 360 may be maintained constant. Although the output voltages of the DC/DC converters 312 through 343 may change based on the feedforward compensation, the total amount of power output from the DC/DC converters 312 through 343 does not increase or decrease.

For example, when a number of batteries included in the battery system 300 is three (N=3) and four (N=4), values of k(i) and values of the feedforward compensation $SOC_{diff} * k(i)$ are as indicated in Tables 1 and 2 below.

TABLE 1

| | i | | |
|---|---|---|---|
| | 1 | 2 | 3 |
| k(i) | 0.5 | 0 | −0.5 |
| $SOC_{diff}$ * k(i) | 0.5 * $SOC_{diff}$ | 0 | −0.5 * $SOC_{diff}$ |

TABLE 2

| | i | | | |
|---|---|---|---|---|
| | 1 | 2 | 3 | 4 |
| k(i) | 1 | 0 | 0 | −1 |
| $SOC_{diff}$ * k(i) | 1 * $SOC_{diff}$ | 0 | 0 | −1 * $SOC_{diff}$ |

Referring to Tables 1 and 2, the sum of the values of k(i) is "0." In addition, the sum of the values of $SOC_{diff} * k(i)$ is "0."

FIG. 4 illustrates an example of an operation of DC/DC converters.

Referring to FIG. 4, a power supply apparatus 400 includes a battery 410, a first DC/DC converter 420, a second DC/DC converter 430, and a power converter controller 440. In the example of FIG. 4, the power supply apparatus 400 includes two DC/DC converters. However, this example is provided only for ease of description, and the power supply apparatus 400 may include any number of DC/DC converters.

The first DC/DC converter 420 and the second DC/DC converter 430 output a voltage by converting an output voltage of the battery 410. The first DC/DC converter 420 includes a first inductor (L1), a first switch (SW1), and a second switch (SW2). The second DC/DC converter 430 includes a second inductor (L2), a third switch (SW3), and a fourth switch (SW4).

The power converter controller 440 is a device that controls a magnitude of the output voltage of the first DC/DC converter 420 and the second DC/DC converter 430. For example, the power converter controller 440 controls the magnitude of the output voltage of the first DC/DC converter 420 and the second DC/DC converter 430 based on a state of the battery 410.

The power converter controller 440 outputs control signals to control on and off states of SW1, SW2, SW3, and SW4. For example, SW1 and SW2 are not simultaneously turned on or off, but operate complementarily. Also, SW3 and SW4 are not simultaneously turned on or off, but operate complementarily. Similarly, SW1 and SW3 are not simultaneously turned on or off, but operate complementarily. Also, SW2 and SW4 are not simultaneously turned on or off, but operate complementarily.

For example, when SW1 of the first DC/DC converter 420 is turned on, power of the battery 410 is stored in L1. At this time, SW2 is in the off state. When SW2 is turned on, the power stored in L1 and power of the battery 410 are stored in a capacitor C. At this time, SW1 is in the off state.

Similarly, when SW3 of the second DC/DC converter 430 is turned on, power of the battery 410 is stored in L2. At this time, SW4 is in the off state. When SW4 is turned on, the power stored in L2 and power of the battery 410 are stored in the capacitor C. At this time, SW3 is in the off state.

The first DC/DC converter 420 and the second DC/DC converter 430 operate with a phase difference of 180°. That is, SW1 and SW3 operate with a phase difference of 180°, and SW2 and SW4 operate with a phase difference of 180°.

A frequency of the voltage output from the first DC/DC converter 420 and the second DC/DC converter 430 is two times higher than a frequency of the control signals of the controller 440.

Figure 5:
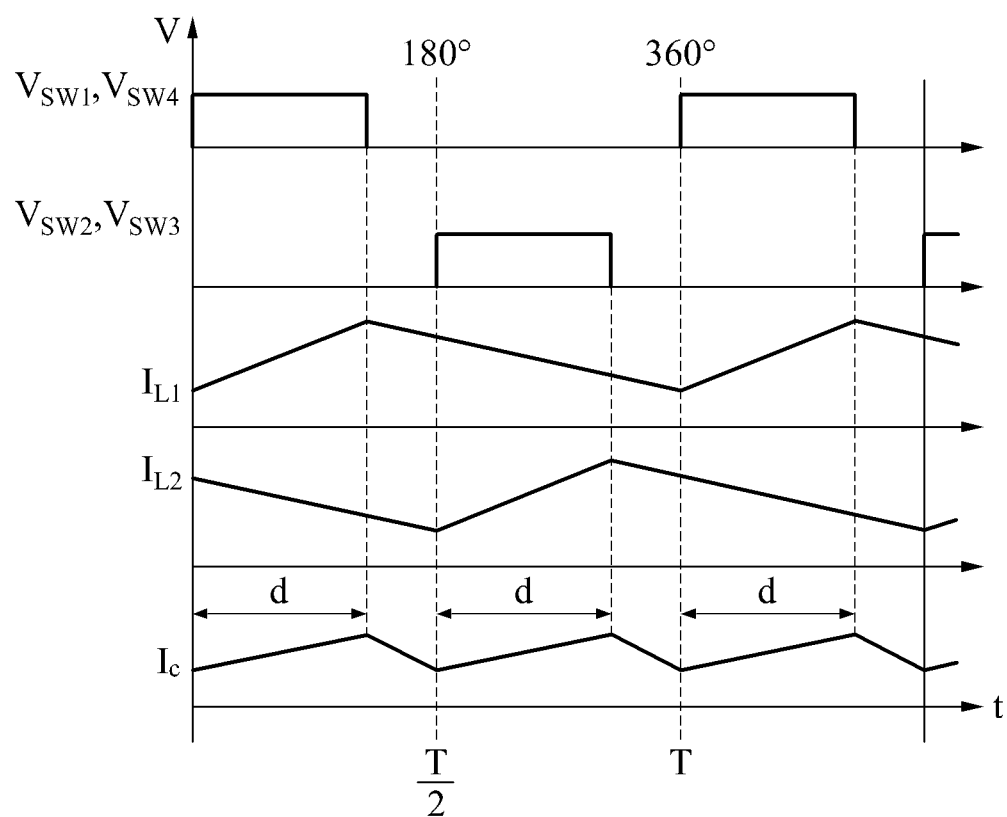
FIG. 5 illustrates an example of an operation of a DC/DC converter that converts power of a battery in response to control signals of a controller.

FIG. 5 illustrates an example of an operation of a DC/DC converter that converts power of a battery in response to control signals of a controller (not shown in FIG. 5, but shown in FIGS. 1, 2, and 4).

Referring to FIG. 5, a first switch voltage ($V_{SW1}$), a second switch voltage ($V_{SW2}$), a third switch voltage ($V_{SW3}$), and a fourth switch voltage ($V_{SW4}$) are control signals output from the controller. A phase difference between $V_{SW1}$ and $V_{SW3}$ is 180°, and a phase difference between $V_{SW2}$ and $V_{SW4}$ is 180°. A First Inductor Current ($I_{L1}$) is a Current of a First Inductor (L1). When $I_{L1}$ increases, power stored in L1 increases in proportion to $I_{L1}$. A second inductor current $I_{L2}$ is a current of a second inductor (L2). When $I_{L2}$ increases, power stored in L2 increases in proportion to $I_{L2}$.

In an initial state, for example, t=0, $V_{SW1}$ and $V_{SW4}$ are high and $V_{SW2}$ and $V_{SW3}$ are low during a predetermined interval (d). As a result, a first switch (SW1) and a fourth switch (SW4) are turned on and a second switch (SW2) and a third switch (SW3) are turned off. Thus, $I_{L1}$ increases in proportion to time, and the power stored in L1 increases in proportion to $I_{L1}$. SW4 having a phase difference of 180° with respect to SW3 is turned on while SW1 is turned on. Thus, the power stored in L2 and power of the battery are transmitted to a capacitor (C) and are stored in C, and a capacitor current ($I_c$) increases in proportion to time. $I_{L2}$ decreases in proportion to time as the power stored in L2 is supplied to C and stored in C.

After a half cycle elapses, for example, at t=T/2, $V_{SW1}$ and $V_{SW4}$ are low and $V_{SW2}$ and $V_{SW3}$ are high during a predetermined interval (d). As a result, SW1 and SW4 are turned off and SW2 and SW3 are turned on. Thus, $I_{L2}$ increases in proportion to time, and the power stored in L2 increases in proportion to $I_{L2}$. SW2 having a phase difference of 180° with respect to SW1 is turned on while SW3 is turned on. Thus, the power stored in L1 and power of the battery are transmitted to C and are stored in C, and $I_c$ increases in proportion to time. $I_{L1}$ decreases in proportion to time as the power stored in L1 is supplied to C and stored in C.

After another half cycle elapses, for example, at t=T, $V_{SW1}$ and $V_{SW4}$ are high and $V_{SW2}$ and $V_{SW3}$ are low during a predetermined interval (d). As a result, SW1 and SW4 are turned on and SW2 and SW3 are turned off. Thus, $I_{L1}$ increases in proportion to time, and the power stored in L1 increases. SW4 having a phase difference of 180° with respect to SW3 is turned on while SW1 is turned on. Thus, the power stored in L2 and the power of the battery are supplied to C and stored in C, and $I_c$ increases in proportion to time. $I_{L2}$ decreases in proportion to time as the power stored in L2 is supplied to C and stored in C.

All of the switches SW1, SW2, SW3, and SW4 are in an off state during a predetermined interval (T/2−d) in every half cycle (T/2). During the predetermined interval (T/2−d), C does not receive power from the battery, L1, and L2, and supplies the power stored in C to a component, like the external component 150 in FIG. 1 or the external component 360 in FIG. 3. $I_c$ decreases in proportion to time during the predetermined interval (T/2−d) in every half cycle (T/2).

According to the examples described above, a series connection of power converters does not require a high boosting ratio in comparison to a parallel connection of power converters and enables voltage control independent of current control. In addition, balancing among batteries is effectively controlled by increasing a magnitude of a voltage output from a power converter in proportion to a value of an SOC of a battery connected to the power converter.

According to the examples described above, balancing among batteries is effectively performed by using feedforward compensation through which a total amount of power output from a battery system remains constant. In addition, an energy conversion loss that occurs when an isolated step-up converter is used is reduced by using a non-isolated step-up converter.

The power converter controllers 112, 122, and 132 and the controller 150 in FIG. 1, the controller described with respect to FIG. 2, the power converter controllers 314, 324, 334, and 344 and the controller 350 in FIG. 3, the power converter controller 440 in FIG. 4, and the controller described with respect to FIG. 5 that perform the various operations described with respect to FIGS. 1-5 may be implemented using one or more hardware components, one or more software components, or a combination of one or more hardware components and one or more software components.

A hardware component may be, for example, a physical device that physically performs one or more operations, but is not limited thereto. Examples of hardware components include resistors, capacitors, inductors, power supplies, frequency generators, operational amplifiers, power amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Functional programs, codes, and code segments for implementing the examples disclosed herein can be easily constructed by a programmer skilled in the art to which the examples pertain based on the drawings and their corresponding descriptions as provided herein.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A power supply apparatus comprising:
   direct current to direct current (DC/DC) converters connected in parallel with each other and directly connected to a battery module, and configured to convert a first voltage of the battery module to a second voltage, wherein the second voltage is supplied to an external component of the power supply apparatus; and
   a power converter controller configured to operate a switch of one of the DC/DC converters in phase with a switch of another one of the DC/DC converters.

2. The apparatus of claim 1, wherein the DC/DC converters are connected in series to DC/DC converters of a neighboring power supply apparatus.

3. The apparatus of claim 1, wherein the DC/DC converters are connected to the external component of the power supply apparatus; and
   the DC/DC converters are further configured to supply power of the battery module to the external component in response to the external component being a load.

4. The apparatus of claim 1, wherein the DC/DC converters are connected to the external component of the power supply apparatus; and the DC/DC converters are further configured to charge the battery module with power from the external component in response to the external component being a power source.

5. The apparatus of claim 1, wherein a magnitude of the second voltage is controlled based on either one or both of states of charge (SOCs) and states of health (SOHs) of battery modules of power supply apparatuses to be controlled by a controller of the power supply apparatuses.

6. The apparatus of claim 1, wherein a magnitude of the second voltage is controlled based on an SOC and an SOH of the battery module, and an overall SOC and an overall SOH of all of battery modules of power supply apparatuses to be controlled by a controller of the power supply apparatuses.

7. The apparatus of claim 6, wherein the magnitude of the second voltage is further controlled based on a compensation value calculated based on a difference between a maximum value and a minimum value of SOCs of the battery modules of the power supply apparatuses.

8. The apparatus of claim 7, wherein the compensation value is set so that a total amount of power to be output from the power supply apparatuses remains constant.

9. The apparatus of claim 7, the compensation value is set so that the greater the SOC of the battery module to which the DC/DC converters are connected, the greater an amount of power output from the DC/DC converters.

10. The apparatus of claim 1, wherein the power converter controller is configured to control the DC/DC converters to convert the first voltage of the battery module to the second voltage.

* * * * *